United States Patent [19]

Enderle et al.

[11] Patent Number: 5,170,964

[45] Date of Patent: Dec. 15, 1992

[54] PROPELLING NOZZLE FOR THE THRUST VECTOR CONTROL FOR AIRCRAFT EQUIPPED WITH JET ENGINES

[75] Inventors: Heinrich Enderle; Klaus Rüd, both of Gröbenzell; Helmut-Arnd Geidel, Karlsfeld, all of Fed. Rep. of Germany

[73] Assignee: MTU Motoren- und Turbinen-Union Munchen GmbH, Fed. Rep. of Germany

[21] Appl. No.: 768,573

[22] PCT Filed: Mar. 21, 1990

[86] PCT No.: PCT/DE90/00226

§ 371 Date: Nov. 1, 1991

§ 102(e) Date: Nov. 1, 1991

[87] PCT Pub. No.: WO90/11222

PCT Pub. Date: Oct. 4, 1990

[30] Foreign Application Priority Data

Mar. 22, 1989 [DE] Fed. Rep. of Germany ....... 3909347

[51] Int. Cl.⁵ .............................................. B64C 15/02
[52] U.S. Cl. ........................................ 244/52; 244/55; 244/12.5; 239/265.19; 239/265.35
[58] Field of Search ..................... 244/12.5, 230, 207, 244/52, 36, 55, 15; 239/265.19, 265.27, 265.29, 265.35, 265.37, 265.39, 502; 60/230

[56] References Cited

U.S. PATENT DOCUMENTS

| | | | |
|---|---|---|---|
| 2,420,323 | 5/1947 | Meyer et al. | 244/52 |
| 2,604,276 | 7/1952 | Huber | 244/55 |
| 2,928,238 | 3/1960 | Hawkins, Jr. | 244/52 |
| 2,964,267 | 12/1960 | Davidson | 244/207 |
| 2,964,905 | 12/1960 | Hewson et al. | 244/52 |
| 3,087,303 | 4/1963 | Heinze et al. | 244/52 |
| 3,148,848 | 9/1964 | Price | 244/52 |
| 3,333,793 | 8/1967 | Offen, Jr. et al. | 244/52 |
| 3,581,995 | 6/1971 | Fischer | 239/265.19 |
| 3,610,556 | 10/1971 | Charlton, Jr. | 244/52 |
| 3,640,469 | 2/1972 | Hayes et al. | 239/265.35 |
| 4,026,500 | 5/1977 | Grow | 244/36 |
| 4,586,042 | 2/1986 | Carr | 244/36 |
| 4,763,840 | 8/1988 | Madden | 239/265.35 |
| 5,042,745 | 8/1991 | Duerr | 244/12.5 |

FOREIGN PATENT DOCUMENTS 418844 2/1967 Switzerland ..................... 244/52

Primary Examiner—Galen Barefoot
Attorney, Agent, or Firm—Evenson, Wands, Edwards, Lenahan & McKeown

[57] ABSTRACT

The proposal is for a thrust nozzle for aircraft fitted with jet engines especially for lateral thrust vector control, in which the upstream ends of at least two flaps (8, 12) actuated via lever-like adjusters are arranged to pivot simultaneously at different angles of rotation about spindles running across the nozzle axis (20) and between walls (22, 23) running substantially parallel to the nozzle axis of a square nozzle housing in such a way that, with a permanently convergent nozzle contour, a narrowest cross-section is formed between the flaps (8, 12) at the outlet side; one end of each lever-like adjuster (28, 29) is to engage in downstream ends of the flaps, said adjusters being arranged at their movably mutually coupled other ends to travel in a guide path (30) which is curved so as to produce continuously different flap rotation angles; one or more narrowest cross-sections can either be kept continuously constant or change dependently upon the jet deflection angle.

26 Claims, 11 Drawing Sheets

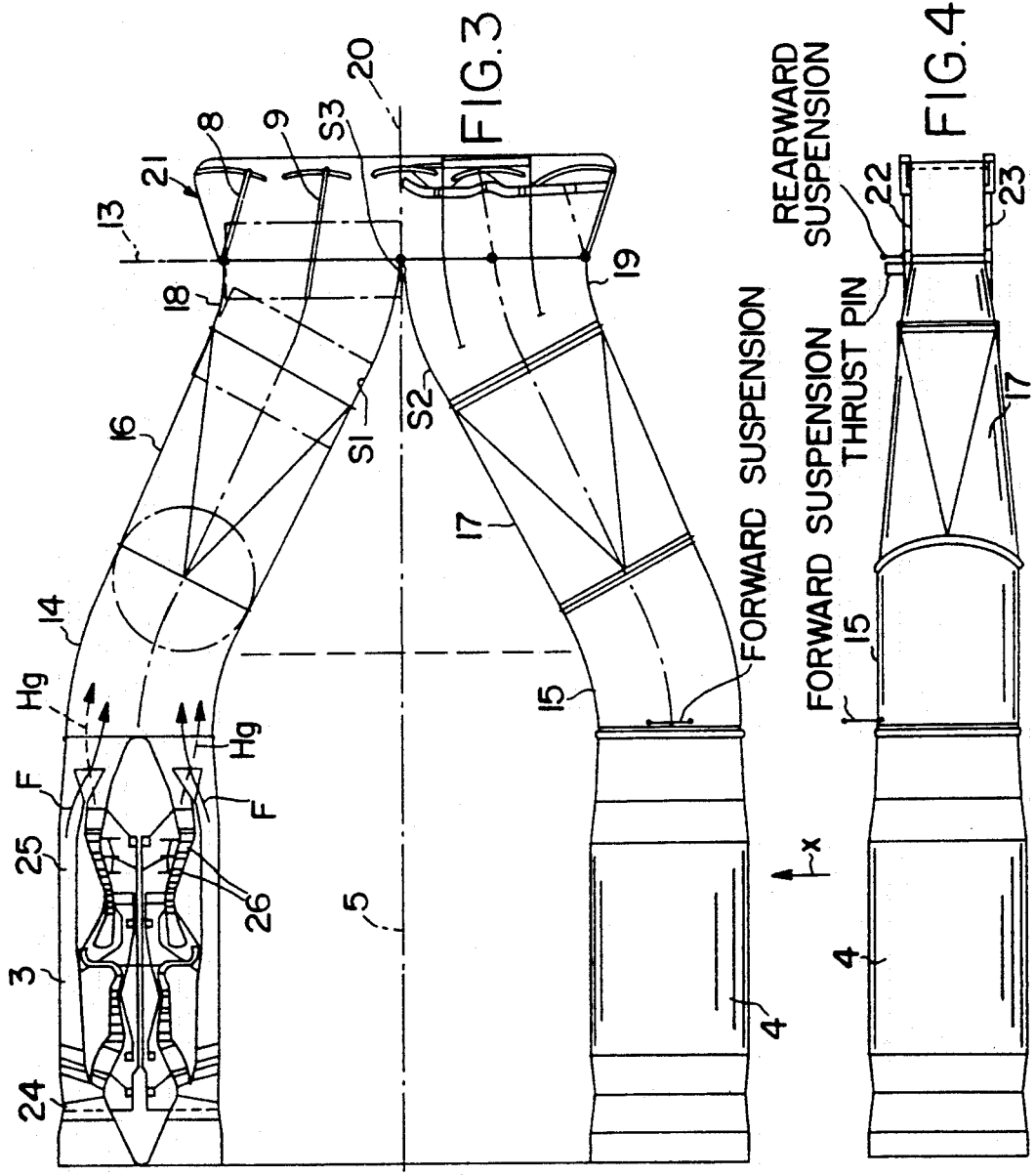

PROPELLING NOZZLE FOR THE THRUST VECTOR CONTROL FOR AIRCRAFT EQUIPPED WITH JET ENGINES

BACKGROUND AND SUMMARY OF THE INVENTION

The invention relates to a propelling nozzle for aircraft equipped with jet engines, and particularly for lateral thrust vector control.

Under the name of "Stealth Bomber B-2", an aircraft which is to be largely insensitive to radar and infrared detection is known, for example, from the German Publication DE-Z *Fluo Revue*, No. 1, January 1988. For the predominant part, the aircraft consists of a relatively far projecting wing unit with fuselage as well as pay load receiving structures integrated into it. For this purpose, by means of tunnel-type air inlets projecting out of the top sides of the wing surfaces, fanjet engines are to be supplied with air which are arranged in the wing structure in a physically inwardly and downwardly retracted manner. In other words, the known case involves a subsonic aircraft concept also because, in order to limit heat emissions resulting from the thrust jet, the thrust jet is a mixture of a hot core jet, relatively high parts of fan air -and additionally taken-in boundary layer air. This is in contrast to conventional aircraft which are designed for supersonic flight, are constructed as combat aircraft or as arms carriers and can be detected relatively easily by, among other devices, infrared sensors, and in the case of which often gas turbine jet engines with a relatively low bypass flow ratio are used in combination with an afterburning system (afterburner) which can be switched on, for example, for the supersonic flight operation.

From the German Patent Document DE-PS 11 44 117, a jet deflection arrangement is known which can be used, in particular, for vertical take-off aircraft and which consists of pipe bend segments which can be pivoted in a telescopic manner, in combination with an additional jet directing cascade that is situated in the pipe bend segment which can be moved the farthest to the outside and that consists of rotary blades which can each be pivoted simultaneously about respective central axes. The remaining jet deflection which is the result of such a jet directing cascade construction and arrangement is connected with a still considerable throttling effect as well as deflecting losses of the exhaust gas jet with the corresponding repercussions on the engine. The telescopic movability of the pipe bend segments is comparatively complicated and not free of susceptibility to trouble (thermally caused pipe warping). Also, in the known case, a response action for a thrust vector control should be expected that is relatively slow with respect to time.

From the German Patent Document DE-GM 70 08426, a thrust jet coupling arrangement is known in which deflecting blades arranged in the manner of a deflecting cascade are to each consist of a fixed inlet section and individual sections which can be pivoted on it continuously in order to thus try to eliminate the disadvantage of the already discussed throttling effect on the engine. It is a prerequisite for the implementability of the known case that corresponding multi-member deflecting blades with their respective first rotating shafts are arranged in the area of a diagonally cut outlet plane of a housing wall end. With respect to an axially symmetrical oncoming flow, no jet deflection or thrust vector control is possible in the known case which takes place on both sides of this oncoming flow in a plane, that is, toward one direction and to a direction that is opposite to it. On the whole, between the deflecting blades, no constant outlet cross-section or narrowest cross-section in the sense of a "convergent nozzle", which always accelerates the flow, is made available in the outlet plane. The adjusting expenditures and the degree of susceptibility to disturbances with respect to linkages between the individual blade segments are relatively high.

A propelling nozzle according to the initially mentioned type is known from the U.S. Pat. No. 3,640,469. In this known case, it is assumed that three flaps exist which are arranged at the same mutual distance in the plane containing the axes of rotation. In this case, the three flaps are to be actuated by way of a comparatively complicated multiple lever and link arrangement which partly operates in a manner of a gearing. In this case, each outer flap is non-rotatably connected with a separate actuating lever extending in the longitudinal direction of the flap. At the respective rearward end, the actuating levers are coupled with the one end of links. At the other end, these links are pivotally coupled at an upstream point with a rocking lever which is pivotable about a downstream housing point. At an arm, which laterally projects out of the rocking lever and is fixedly connected with it, one end of another swivel arm is to be linked which is coupled by means of its other end to the downstream end of another actuating lever. At its other end, this actuating lever is non-rotatably connected with the center flap of the propelling nozzle on the side of the axis of rotation. In the known case, the adjusting force is to be introduced approximately in parallel to the nozzle axis into the laterally projecting arm of an actuating lever (double-armed lever) which is part of an outer nozzle flap. In the known case, while all flaps are controlled simultaneously, a torsion of the rocking lever takes place which is converted to a central differential-angle control of the center flap with respect to the outer flaps. In the known case, it is virtually not possible to be able to control either only two (outer) flaps or more than three flaps in a blade cascade-type manner, in each case, by different torsional angles. The reason is that, particularly in the latter case, it is necessary to be able to locally control larger or smaller thrust jet deflections between two adjacent flaps. In the interest of locally reduced deflecting losses (locally relatively abrupt deflection by way of two flaps of the cascade), it is therefore required to make available correspondingly larger dimensioned local nozzle surface cross-sections and, at the same time, in turn, maintain the required nozzle convergence between two flaps. For this purpose, the known case furnishes no tangible starting point to a solution because it aims exclusively at a constant-surface convergent nozzle construction along the whole deflecting range in the case of thrust vector control. In addition, in the known case, by means of the above-described gearing-type control lever configuration (different lengths of the additional swivel arm and of the additional actuating lever: in this case, center flap), while the flaps are controlled at the same time, deflecting angles of various sizes of the center flap are obtained, while it is pivoted toward the one or toward the other side as well as relatively with respect to the control positions of the two outer flaps, so that the laws endeavored in the known state of the art (keeping the outlet surface constant) cannot be carried out in practice. In other words, the individual degree of freedom for a locally varying flap pivoting is estimated to be very low. The latter applies particularly if the thrust-vector control of the air exhaust gas systems of several engines by means of a cascade-type nozzle system is involved. In addition, in the known case, in view of the flap control, relatively large stress moments are to be expected which affect the control system. Also, the known case can probably be implemented only by means of relatively thick-walled and heavy flaps which have a shape that tapers in a wedge shape from the direction of the respective pivot bearings. In the known case, the total of the control device expenditures is relatively high which is accompanied by an increase in weight.

The above-discussed known nozzle or jet deflecting concepts provide no information concerning a development and an arrangement with respect to a reduced radar and/or infrared detection. These known deflecting concepts also do not concern the problem of processing, in each case, the thrust jets of two or several jet engines in the manner of nozzles and for the purpose of a 2-dimensional thrust vector control in such a manner that, on the nozzle side, a risk of being detected by radar or infrared detection is as low as possible.

The invention is based on the object of providing a controllable propelling nozzle which is suitable for an initially mentioned type of aircraft and which permits a 2-dimensional thrust vector control, while the flap control is as fast as possible, with relatively low control device expenditures, without causing in variable positions impermissible deflecting losses and throttling of one or several exhaust gas flows.

The mentioned object is achieved by a propelling nozzle for aircraft equipped with jet engines, particularly for the lateral thrust vector control, in the case of which at least two flaps actuated by way of lever-type control members are arranged at their upstream ends to be pivotable about pivots extending transversely with respect to the nozzle axis, said flaps being disposed as well between walls of a square nozzle housing extending essentially in parallel to the nozzle axis, said flaps being simultaneously pivotable about different twisting angels in such a manner that—while the nozzle contour course is always convergent—an exit-side narrowest cross-section is formed between the flaps, characterized in that the ends of one side of the lever-type control members are applied to downstream flap ends, the control members being arranged at the level of their other ends movably coupled with one anther so that they can be moved in a track which is connected to be curved for simultaneously always forcing different flap twisting angles.

The invention permits the providing of a nozzle concept, which is convergent in all flap positions, and by means of which exhaust-gas fan air jet mixtures delivered by one or several engines, particularly for the purpose of a variable lateral control of an airplane, can be carried through with extremely low aerodynamic losses. In the area of the fuselage end and/or the wing end, particularly in the case of an aircraft of the initially mentioned type, the propelling nozzle may be constructed to be extremely flat (low installation height) and, because of the comparatively short flap lengths, can be constructed to be comparatively short, which, in turn, has a favorable effect with respect to a comparatively light weight of the nozzle.

In the case of the present propelling nozzle, it is therefore ensured that the geometrically narrowest cross-section which can be adjusted in each case between two flap ends according to the requirements, is situated at the nozzle end and —while avoiding deflecting losses—no flow-through changing repercussions occur on the inside nozzle flow which, in turn, could endanger the engine operation. Even with only two flaps, it is possible to either make available an always convergent nozzle with an always constant narrowest cross-section or an always convergent nozzle with a nozzle surface cross-section or narrowest cross-section which increases as a function of an increasing jet deflecting angle.

According to the invention, advantageously a blade cascade-type multiple flap nozzle may be provided in the case of which a medium or central nozzle flap defines the required or nominal or maximal jet deflecting angle. In view of the after expansion of the carried-through gas flows behind the respective narrowest nozzle cross-section, a possibly resulting slight reduction of the required jet deflection can be compensated by a more pronounced angular incidence of outer flaps relative to the position of the corresponding center nozzle flap.

The designability of the propelling nozzle (flat long-drawn-out rectangular cross-section) which, particularly when several nozzle flaps are used, in a blade cascade-type manner, is extremely flat, reduces the danger of detection with respect to infrared sensors, particularly in combination with an—according to the invention—backwardly and downwardly sloped nozzle outlet or with respect to the inclined installing position of the engine or engines in the or on the aircraft.

The propelling nozzle according to the invention may also be used for the jet deflection or the thrust jet pivoting in a vertical or perpendicular plane, for example, in the case of two jet engines arranged above one another.

Other objects, advantages and novel features of the invention will become apparent from the following detailed description of the invention when considered in conjunction with the accompanying drawings.

BRIEF DESCRIPTION OF THE DRAWINGS

FIG. 3 is an enlarged top view of the overall propulsion system according to FIG. 1 with the two jet engines and pipe lines to the propelling nozzle as well as with a schematic view, which is longitudinally cut open in the transverse direction, of the corresponding engine which is on the right in FIG. 1;

FIG. 4 is a lateral view of the propulsion system viewed in the direction X of FIG. 3 and illustrating suspension details (front and rear);

DETAILED DESCRIPTION OF THE DRAWINGS

Figure 1:
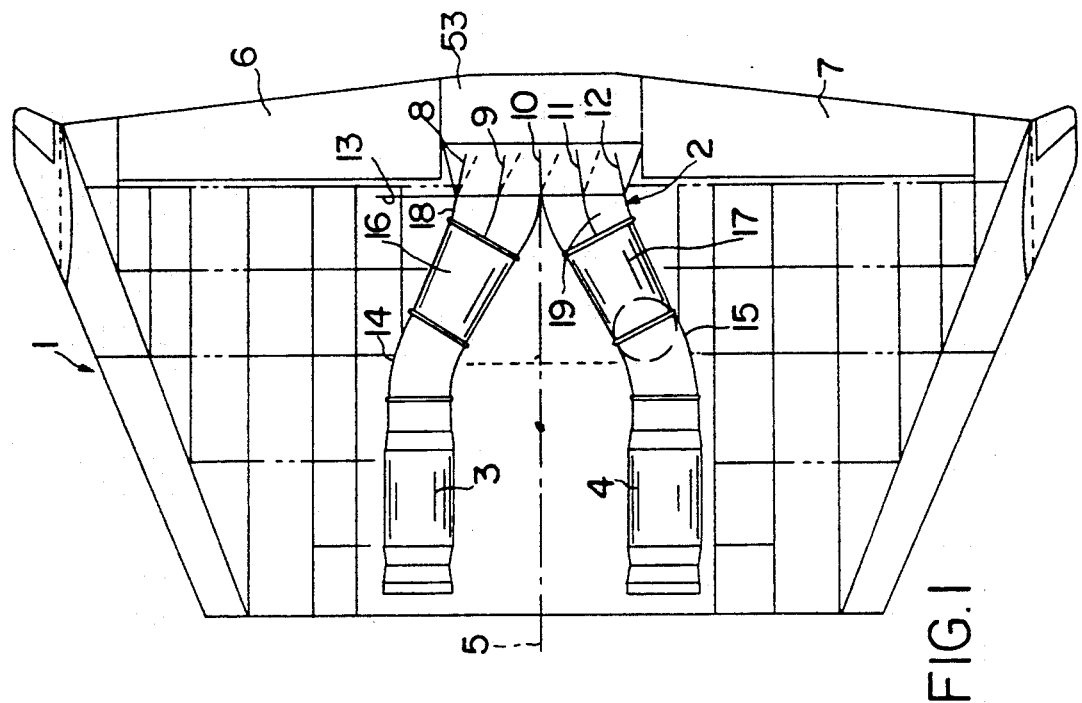
FIG. 1 is a top view of a frontally cut-off combined wing-fuselage system with two gas turbine jet engines which are axially symmetrically arranged in parallel next to one another on the side of the cabin integrated in the wing-fuselage system and are more clearly indicated here by solid lines, together with suitable pipe-type exhaust gas lines to a propelling nozzle according to the invention which is constructed for the throughput and the deflection of both mass flows and which is illustrated with an open top or uncovered.

In FIG. 1, reference number 1 represents the combined wing —fuselage structure of an initially discussed aircraft which is to be insensitive to a very large extent to the enemy's radar and infrared detection. Reference number 2 represents a variant of a propelling nozzle according to the invention which, in this case, in view of a propulsion arrangement of the aircraft, is arranged and constructed with two turbojet engines 3, 4 arranged in parallel next to one another. In this case, the propelling nozzle 2 is arranged symmetrically with respect to the longitudinal symmetry plane 5 of the aircraft with the outlet ending at the wing—fuselage end; in this case, for example, between two additional ailerons 6, 7 of the aircraft. In the present case, the propelling nozzle 2 is constructed in the manner of a cascade and consists, among other things, of five flaps which are arranged at uniform distances from one another from one side to the opposite side and are consecutively numbered 8, 9, 10, 11 and 12. The flaps are pivotally disposed in a plane 13 which in this case is arranged at a right angle with respect to the longitudinal symmetry plane 5. The flaps 8 to 12, for the purpose of the thrust vector control, should be arranged to be simultaneously pivotable about different pivoting angles and operable in such a manner that a narrowest cross-section of the propelling nozzle constructed on the nozzle outlet side is maintained to be always constant. In the present case, the propelling nozzle 2 is in the level flight or straight-ahead flight position (also see FIG. 9). Additional jet deflecting angle variations will be discussed and described in detail in FIGS. 10, 11 and 12.

Figure 2:
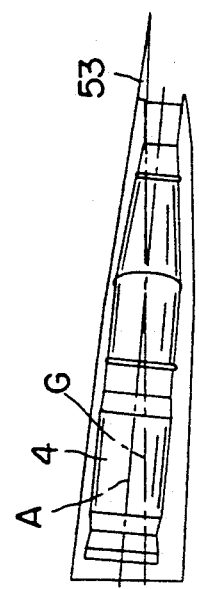
FIG. 2 is a lateral view of the cabin-side integrated left jet engine from FIG. I together with sections of the propelling nozzle in connection with a flap that can be moved into the common nozzle-outlet-side escaping gas mass flow.

FIG. 2 clearly shows the engine and propelling-nozzle installation position which is slightly inclined from the front top to the rear bottom, in this case, illustrated on the jet engine 4 which is on the left in FIG. 1, thus by the sloping of the engine axis A with respect to the longitudinal aircraft axis G.

Figure 8:
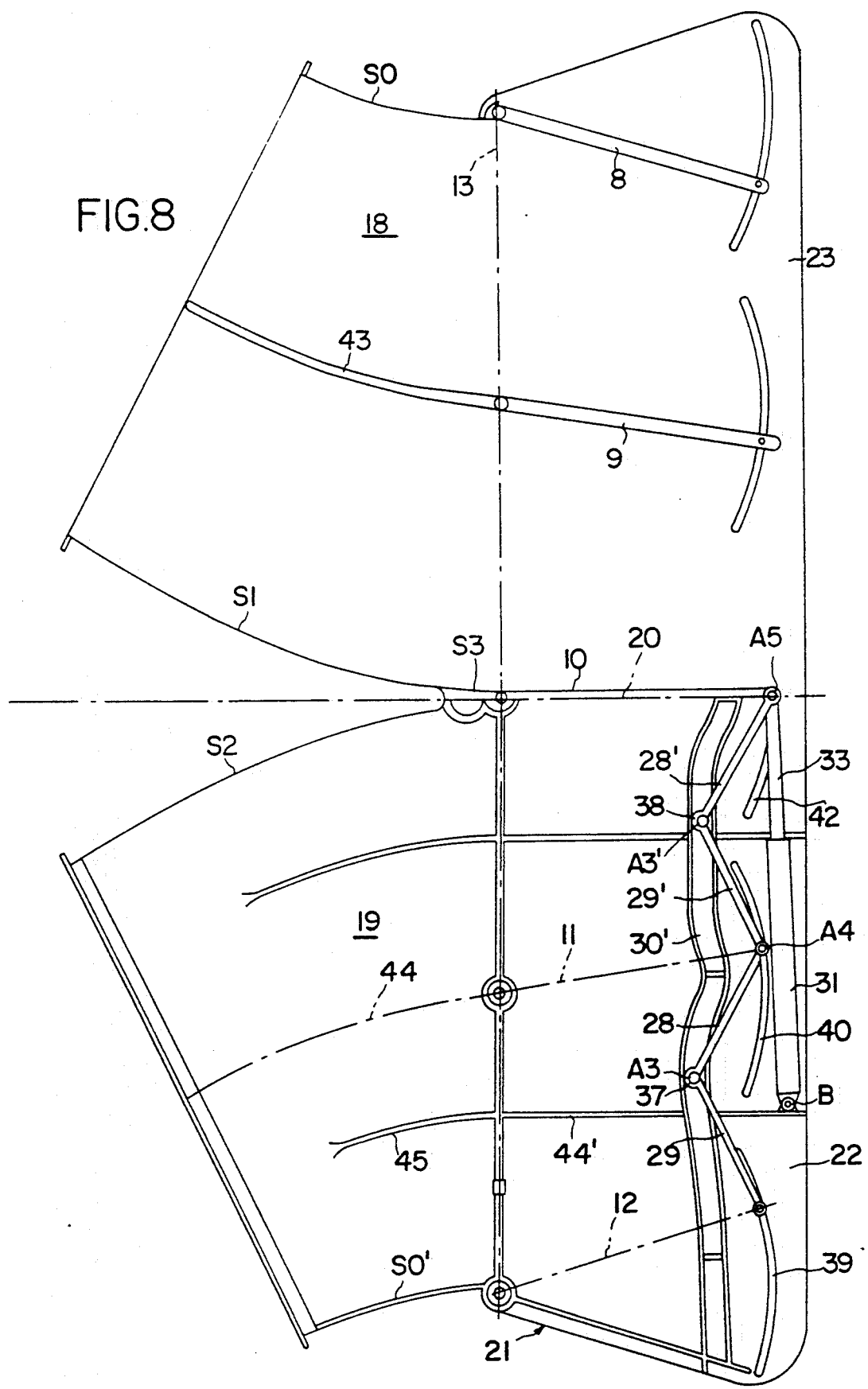
FIG. 8 is a lateral view in the direction Y of the double-nozzle configuration according to FIG. 7 of the invention, which, among other things, shows the partial section of the nozzle housing, which is open on the side as well as in the rear, together with a nozzle flap situated laterally on the outside, as well as propulsion systems enclosed in the manner of a housing and in each case situated on top and on the bottom on the outside on the corresponding nozzle housing walls, together with sections of the control and guiding system.

FIGS. 3 and 4 show more clearly than FIG. 1 the engine-exhaust-gas-flow-side pipe line geometry by means of which the mass flows of fan air flows and respective hot-gas residual flows delivered by the two jet engines 3, 4 are to be supplied to the respective propelling nozzle 2, specifically with deflecting losses of the mass flows that are as low as possible. On the outlet side, the two jet engines are in this case followed by two pipe bends 14, 15 by means of which the flow is deflected here by approximately 30°. Pipe lines 16, 17, which are connected to the pipe bends 14, 15 and have respective straight longitudinal axes, end at respective identical angles of slope symmetrically against the propelling nozzle 2. It is clearly illustrated in FIG. 4 and elsewhere that the pipe lines 16, 17 change from an at first circular cylindrical cross-section to a cross-section which is rectangular on the nozzle-connection side. By means of their outlet ends, the two pipe lines 16, 17 are connected to two pipe-type inlets 18, 19 which have a rectangular cross-section and which have a slightly opposite bend to the pipe bends 14, 15. As also illustrated in FIG. 3, the pipe-type inlets 18, 19 are symmetrically guided together in the manner of a housing by means of their directly adjacent lateral walls S1, S2. At the meeting point as well as approximately in the plane 13, in which the flaps 8 to 12 are pivotally disposed, a housing section 21 is connected which contains the flaps. The respective rectangular double-pipe ends of the two pipe-type inlets 18, 19, at the end-connection-side, may be constructed in the manner of a frame as well as supports of the, in this case, upper and lower walls 22, 23 of the nozzle housing which are disposed opposite one another (FIGS. 4 and 8). On as well as between the two walls 22, 23 (in this case, on the frame side—R—FIG. 8), the flaps 8 to 12 are pivotally disposed in the plane 13, specifically by means of pivots (see in this respect: pivots 24 of the one flap 12 which is on the outside in this case—FIG. 8).

A respective forward articulated-lever-type cabin-side suspension of the mentioned propelling system according to FIGS. 1, 3, and 4 is marked by the letter V; an identical or comparable rear suspension is marked by the letter H (here, on the frame side on R—FIG. 8), and a thrust pin is marked with the letter S.

Depending on the number of the engines, the respective propelling nozzle therefore contains at least one pipe-type inlet which, in turn, is a component of the nozzle housing. As a modification of FIGS. 3, 4, 7 and 8, the pipe-type inlet or inlets may also be constructed to be square or even as transition pipes which change from an initially, for example, still circular cross-section to a, for example, rectangular cross-section, specifically on the end side and connection side at the corresponding housing section 21 of the propelling nozzle which contains the flaps.

According to the number of and the distances between the engines, the pipe-type inlets, thus also those 18 and 19 according to FIGS. 1, 3, 4, 7 and 8, may also be constructed with a straight axis as well as with straight walls. A respective propelling nozzle variant with, for example, three jet engines arranged next to on another will be discussed in detail in connection with FIG. 13.

The construction and arrangement of the propelling system of the aircraft illustrated particularly in FIGS. 1, 2 and 4, in an adaptation to the jet engines 3 and 4 arranged here with a relatively large lateral distance, as well as in combination with the pipe feeder system 14, 15, 16, 17 together with the nozzle-housing-side inlet construction 18, 19, permits an arrangement of the propelling nozzle 2 which is physically retracted toward the center as well as toward the rear and downward. In particular with respect to heat emissions and the resulting danger of infrared detection, a solution is found that is insensitive to being recognized not only with respect to the arrangement of the jet engines 3,4 but also with respect to the propelling nozzle construction itself; in this case, particularly also with respect to the propelling nozzle 2 and its upper rearward or obliquely rearward viewing possibility. A contributing factor to the insensitivity of the propelling nozzle 2 as well of the whole propelling system to heat emission is that, according to the invention, jet engines 3, 4 are provided as fan engines which have relatively large bypass flow ratios. According to the cut-open jet engine 3, this is, for example, a twin-shaft turbofan engine in which the fan 24, as the front fan, delivers into a secondary air duct 25 shrouding the basic engine; that is, the main propulsion thrust is made available by the fan 24. The propelling nozzle 2 is therefore in each case acted upon by a gas mass flow which predominantly consists of relatively cold fan air parts (arrows F) as well as hot gas parts (arrows Hg) of the basic engine which are discharged from the low-pressure turbine 26 (=driving turbine of the fan 24), together with gas generators. As also illustrated on the jet engine 3, a mixer M for the fan air parts and hot gas parts F and HG is provided which is constructed of surrounding pocket-type recesses so that a relatively low exhaust gas temperature is present already at the outlet side at the engines 3, 4 which is clearly reduced until reaching the propelling nozzle 2, specifically to temperature values of approximately 200° C. Thus, the propelling nozzle 2 can completely or predominantly be constructed in a "light construction", for example, from aluminum or an aluminum alloy. The temperature level of the respective pipe feeders to the propelling nozzle 2 as well as also the latter itself may therefore be estimated to be relatively low with respect to heat emissions (danger of infrared detection). In addition, according to the invention, there is the possibility to provide a flow surrounding the whole propelling system, particularly the pipe lines and the propelling nozzle itself in the manner of a cooling film, specifically by means of air boundary layer flows taken in in the vicinity of the engine inlets.

Figure 7:
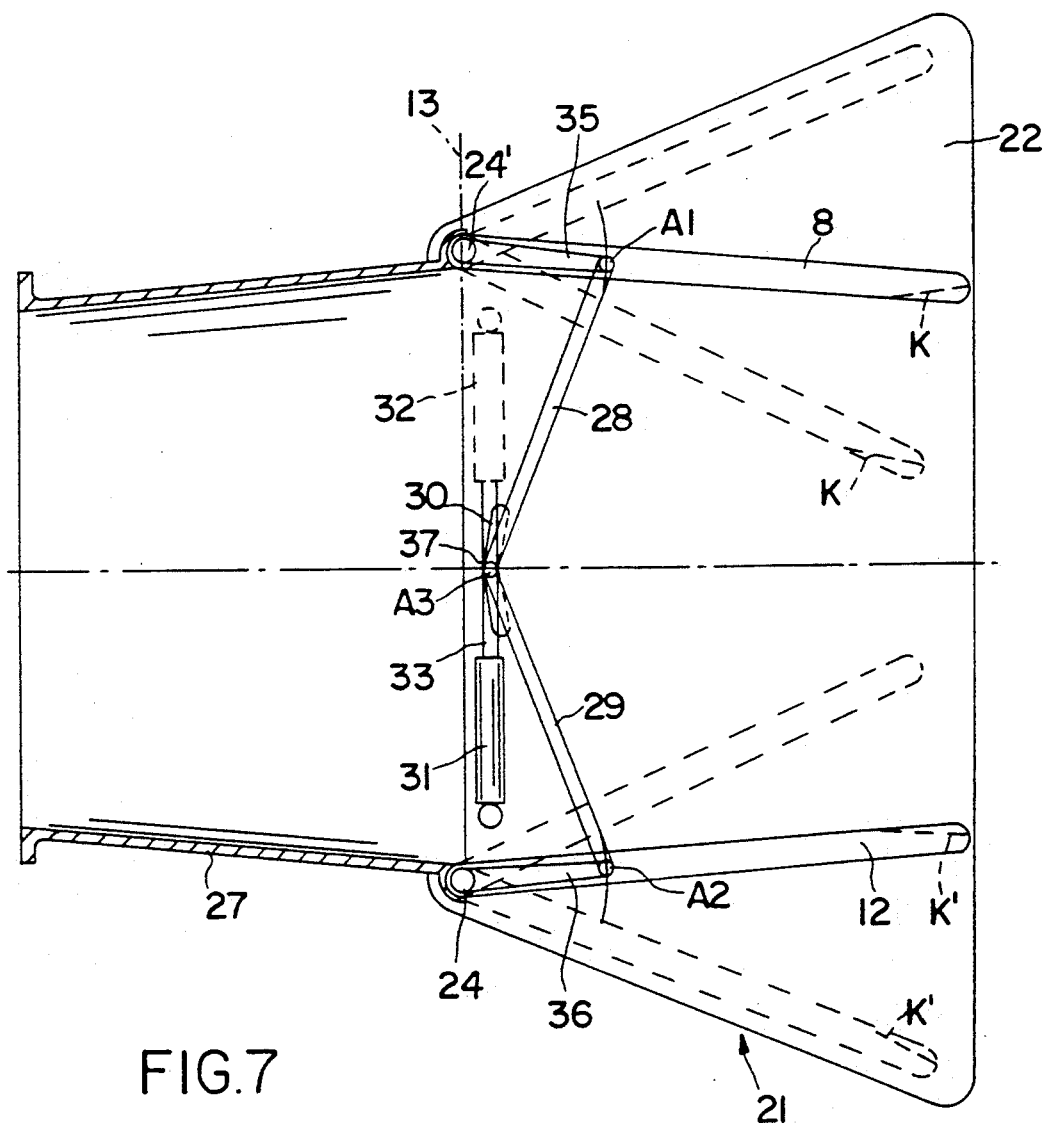
FIG. 7 is an enlarged illustration of the double-nozzle configuration according to FIG. 3, with respect to one half, as a top view and, with respect to the other half, uncovered on top and exposing interior structures (flaps, aerodynamic flow divider walls), and in which, with respect to one half (top view), propulsion devices, which are disposed on top on the outside, among others, on the nozzle housing, the accordion-type control lever kinematics together with an interacting guiding path are shown.

Particularly FIGS. 1, 3 and 7 also show that the housing section 21 of the propelling nozzle 2 in which the flaps 8 to 12 are arranged pivotally between the mutually opposite walls 22, 23, from the inlet side to the nozzle outlet side, is physically expanded in an adaptation to the maximal outer angular deflection of a respective outer flap 8 or 12. In this case, also see FIG. 12, maximally possible angular deflection of the one outer flap in the case of a resulting maximal jet deflection of in this case for example, 25° is feasible. To this extent, this local expansion of the housing section 21 results in relatively low aerodynamic losses with respect to the outer air flow, since basically only the respective upper and lower walls 22 or 23 in this case (FIG. 4 and 8) are affected by it. This therefore takes place by means of a propelling nozzle configuration in which the housing section 21 between the walls 22 and 23 is predominantly open not only at two sides which are opposite one another with respect to the pivot plane (in this case, for example, horizontal), but also in the direction of the nozzle outlet side; that is, in this case, in sections, is blocked off only by means of the respective outer flaps 8 and 12 on the hot-gas side with respect to the outer surroundings. The above-mentioned construction may also be described by stating that, on a rectangular, essentially frame-type end section R (FIG. 8), ends of the mutually opposite walls 22, 23 are arranged or constructed which project freely in parallel to the nozzle axis and between which the flaps 8 to 12 can be pivoted.

However, the above-mentioned characteristics of the invention, in principle, do not exclude that the whole nozzle housing or the housing section 21 may be constructed to be closed off by itself in a square or rectangular manner.

In this case, a respective outer flap 8 and 12 may, at the same time, be constructed as a sealing device for the hot-gas flow guided between them with respect to the outside environment.

Advantageously, in this case, the respective outer flaps 8 and 12 may be arranged to be sealed off in the plane of the rotating axis with respect to adjacent pipe wall ends and/or guide wall ends as well as along the flap edges bordering on the walls 22, 23 of the nozzle housing section 21 by means of rigid, elastic or movable sealing devices. Preferably, brush seals may be used in this case. The use of a sealing device made of rubber or the like or in the form of teflon cords is also conceivable.

Figure 5:
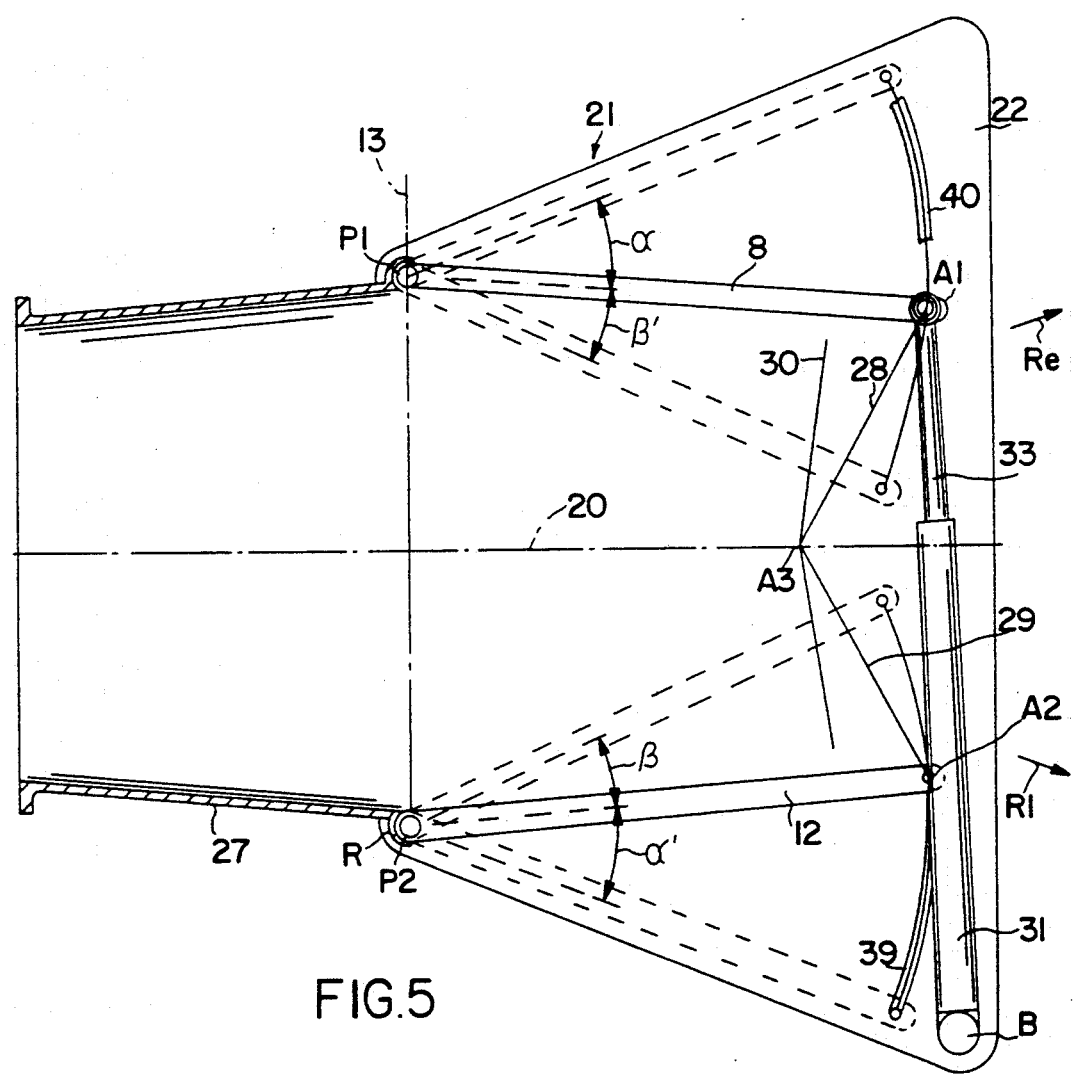
FIG. 5 is a top view and partially (pipe inlet) sectional view of a schematic basic construction of the propelling nozzle, to be considered as being assigned to a single jet engine, having two flaps which, always while maintaining the narrowest nozzle end cross-section constant, can be pivoted about various pivot angles, for the purpose of a horizontal jet pivoting on both sides, while including variable respective flap positions for this purpose, in combination with pertaining propulsion control and guiding devices (paths)
Figure 6:
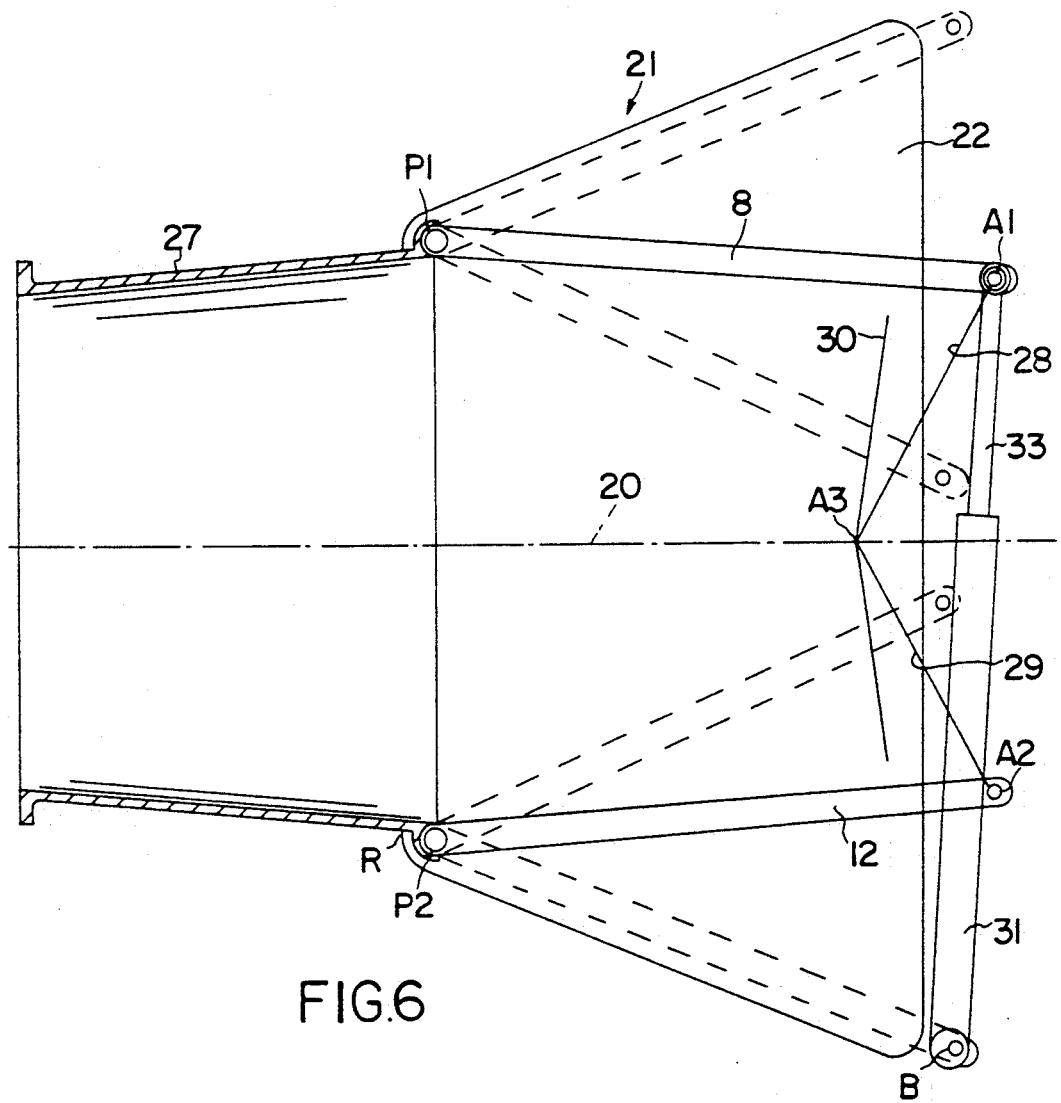
FIG. 6 is a view of another basic construction of the propelling nozzle illustrated as in FIG. 5 and deviating from FIG. 5 only because of the fact that, when the nozzle housing is axially shortened and the flap length is maintained, the flaps always project out of the housing on the end side, with a corresponding arrangement of the propulsion systems and parts of the control kinematics (articulated levers) downstream of the housing end.

The above-discussed characteristics of the invention can analogously also be applied to the now discussed propelling nozzle variants according to FIGS. 5 to 6 and may also analogously be used in the case of the latter.

The propulsion and control system discussed in connection with FIGS. 5 to 6, in turn, can be analogously applied to the embodiment particularly according to FIG. 7.

Thus, according to FIGS. 5 to 6, the propelling nozzle according to the invention may also be used or practiced advantageously in an assignment to an individual jet engine for the purpose of a variable thrust vector control. For this purpose, the propelling nozzle consists, for example, of a rectangular pipe inlet 27, at the frame-type end part R of which (also see, for example, FIG. 8), the sections of the mutually opposite walls 22, 23 of the nozzle housing which project in parallel to the nozzle axis (axis 20) are to be connected in this case also. FIGS. 5 to 6, in this case, only show the one section of the wall 22 which is on top here and is part of the housing section 21. Within the framework of these basic constructions of the propelling nozzle according to the invention, there are therefore, in the respective plane 13, the position of which coincides with the connection-side connecting plane between the inlet and the housing section 21, only two flaps 8 and 12 arranged at a distance and pivotal about vertical pivots (Points P1 and P2) and at the same time about different twisting angles. The two flaps 8 and 12, at the same time, carry out the initially (see, for example, FIGS. 1, 3 and 7) noted function of the "outer flaps", among other things, also with respect to their sealing effect.

As also shown clearly in FIGS. 5 and 6, the two flaps 8 and 12, on the hot-gas as well as ambient-air side, are arranged, aerodynamically advantageously flush with the surfaces, in alignment with their upstream ends, on circularly cylindrically recessed surfaces of the frame-type end part R of the two lateral walls of the pipe-type inlet 27. In other words, the flaps 8 and 12, in each case being aerodynamically aligned flush with the surfaces, connect to the ends of the two mutually opposite lateral walls of the inlet 27.

In this case, the respective solid lines indicate the straight-ahead or level flight position of the flaps 8 and 12 (first end position or basic position). The position of the two flaps 8 and 12, which is indicated by the interrupted line, represents a second joint end position of both flaps 8 and 12 with resulting maximal jet deflection (arrow Re) toward one side (rear—right). A third end position of both flaps 8 and 12, which is indicated by an interrupted line and is covered by cross-hatching, represents the resulting maximal jet deflection (arrow Rl) toward the other side (rear—left). In all end positions mentioned as examples, a narrowest cross-section, which is maintained constant, exists between the flaps 8 and 12 while the nozzle construction is always convergent.

FIG. 5 also illustrates clearly that for the second joint end position of the flaps 8 and 12 (arrow Re), the one flap 8 must be controlled out of the original straight-ahead flight position, at the same time, about a larger flap twisting angle $\alpha$ than the other flap 12 (twisting angle $\beta$) while, for the third joint end position (arrow Rl), the existing conditions are exactly reversed; that is, flap 12 must be controlled or pivoted by a larger pivoting angle $\alpha'$ than flap 8 (twisting angle $\beta'$). The aspects that were previously mentioned and noted with respect to FIG. 5 analogously also apply in connection with the propelling nozzle variant according to FIG. 6.

In order to be able to swivel the flaps 8, 12 (FIG. 5) in the indicated manner, for the purpose of a jet deflection and a thrust vector control, at the same time, by different pivoting angles, lever-type control members 28, 29 are provided which are schematically represented by corresponding lines and which, in this case, for example, by means of their one ends (Points A1, A2) are applied in an articulated manner to the downstream ends of the flaps 8, 9. By means of their other ends, which are movably coupled to one another (lever hinge point A3), the lever-type control members 28, 29 can be moved in an assigned track 30 which in this case is also indicated only by a line and which, in an adaptation to the required flap control—particularly the simultaneous control about different pivoting angles—is curved. In this case, the track 30 is arranged to extend essentially transversely to the nozzle axis 20. In particular, in this case, the track 30 is curved uniformly on both sides by being arched out toward a joint nozzle symmetry point. In this case, this nozzle symmetry point coincides with the position of the lever hinge point A which the latter takes up when the propelling nozzle together with the flaps 8, 12 is in the straight-ahead flight position which previously had also been defined as the first end position or basic position of the propelling nozzle. In a manner that is not shown in FIG. 5 but is analogously clearer in FIG. 7, the lever-type control members 28, 29 may be movable or positively guided on or at the level of the joint linking or hinge point A3 by means of a roller or the like in the track 30 which, for this purpose, must be constructed to be of a connecting-link type.

Hydraulically or pneumatically operated control cylinders 31 (FIG. 5) or 31, 32 (FIG. 8) may be provided as the driving systems for the flap control. However, the use of other, for example, motor-driven operating devices, such as ball caster spindles, is also easily possible. According to FIG. 5, a control cylinder 31 is therefore indicated which is fastened to the downstream end of the nozzle housing, in this case, therefore, a control cylinder 31 which is fastened in Point B laterally movably on the outside to the upper wall 22 and which, by means of its tension-compression-rod-type control member 33, at the level of the one flap-end-side lever hinge point A1, is movably coupled to the one flap 8. When the one flap 8 is controlled, the other flap 12 is therefore pivoted along at the same time by way of the described control lever system 28, 29 together with the track 30, while complying with the law of different flap twisting or swivel angles in the manner of the resulting variable thrust vector control possibilities.

It is advantageous for the lever-type control members 28, 29 interacting with the flaps 8 and 12, the tracks and possibly including the control cylinders 31 (FIG. 5) or 31, 32 (FIG. 8) to be arranged outside the nozzle hot-gas flow and thus in a manner that is unimpaired by it and without any aerodynamic impairment of the hot gas flow.

Deviating from the embodiment, for example, according to FIG. 5, it would definitely be possible within the scope of the invention, among other things, in view of the existing installation and mounting conditions, to arrange the driving devices for the flap control, therefore the control cylinder 31, in such a manner that the outer end of the pertaining control member 33 is applied in Point A 3 or at the level of this Point A 3 (lever hinge point or lever linking point)

Within the scope of the invention, there is, for example, deviating from FIG. 5, the possibility that, particularly in view of a construction of the driving systems as control cylinders 31, they may be arranged either, according to FIG. 5, downstream or upstream of the respective track 30; here, for example, in the case that the corresponding control member 33 should be coupled to a flap, such as 8, on the end side, for example, in the central area.

It is advantageous to also provide according to the invention that the control cylinders 31 (FIG. 5) or 31, 32 (FIG. 8) be arranged angularly offset with respect to one another by 180° laterally outside on the upper and lower wall 23 and 24 of the respective housing section 21. In this case, the second or lower control cylinder 32, which is not visible in FIG. 5, with its tension—compression-rod-type control member, would on the end side be applied to the other flap 12 in a hinged manner with the assignment of relevant lower level control kinematics together with the track. This arrangement permits a uniform distribution of the weight and also has an advantageous effect with respect to a uniform control force introduction. Also if a control cylinder should fail, such as 31, the flap control would still be ensured by way of the other control cylinder, such as 32.

FIG. 6 represents another modification with respect to FIG. 5 basically only as a result of the fact that a propelling nozzle exists which is axially shortened in its overall length with respect to the housing section 21, while the flap length according to FIG. 5 is maintained. Downstream of the nozzle housing opening or of the end of the wall 22, which is on top here, a control cylinder 31 together with the tension-compression-rod-type control member 33 is arranged on it, the control member 33 being hinged on the end side to one 8 of the two flaps 8 or 12 which project out of the housing opening. According to FIG. 6, there is therefore, with respect to FIG. 5, a position of the track 30 as well as of the lever-type control elements 28, 29 which is displaced farther to the rear in the direction of the nozzle outlet, the control elements 28, 29 therefore, on the housing side, partially hanging over freely toward the rear. Otherwise, the method of operation of the propelling nozzle concept according to FIG. 6 is virtually identical to that according to FIG. 5. The reduction of the installing length, a reduction in weight as well as a construction without guide slots are further advantages of the propelling nozzle construction of FIG. 6 in comparison to FIG. 5.

As discussed, by the way, initially in connection with FIGS. 3, 4 as well as 7 and 8, the propelling nozzle configurations according to FIG. 5 and 6 are also to be constructed in such a manner that the mutually opposite, here therefore upper and lower walls 22 and 23 of the housing section 21 in which the flaps 8, 12 are arranged so that they can be completely or predominantly pivoted, in an adaptation to the flap sloping course resulting from the maximal angular deflection (see α, α'—FIG. 5) of one 8 or the other flap 12, are physically expanded, specifically from the inlet side in the direction of the outlet side of the housing section 21.

In regard to the initially discussed propelling nozzle 2 in the cascade-type multiple flap arrangement, FIG. 7 illustrates clear individual details also with respect to the control kinematics and the appropriate special track construction. Particularly, as a modification of the "basic construction" according to FIG. 5, FIG. 7 provides that the lever-type control members—viewed in sequence from one side of the propelling nozzle to the other side—marked with references numbers 29, 28, 29' and 28' are coupled with one another in an articulated, accordion-type manner. With respect to the one joint lever linking or hinge points A3, A3', the corresponding lever-type control members 29, 28 and 29', 28', as an accordion-type lever connection, by means of rollers 37, 38 arranged at the level of Points A3, A3', therefore engage in assigned sections of a track 30' which in regard to the respective flap twisting angles, which at the same time are to be achieved in a different manner, extends alternately in a straight line as well as continuously sometimes to one or the other side in a differently arched manner. By means of their other or remaining ends, for example, the lever-type control members 28, 29' are movable also on joint linking or hinge points A 4 coupled to one another. At the level of hinge point A4, the downstream end of the flap 11 is linked by way of a pin so that it can be taken along. The downstream end of the here central flap 10 is applied to the remaining or other end of the lever-type control member 28' by way of a pin so that it can be taken along. The same applies analogously with respect to the other or remaining end of the lever-type control member 29 and the coupling with the here one outer flap 12 so that it can be taken along. In this case, the pins which are situated on the downstream flap ends are guided through the, in this case, upper wall 22, as an outer lengthening, by means of flap-pivot concentric slots 39, 40, 42. Advantageously, the track 30' forms an additional wall reinforcement which extends on the outside on the here, for example, upper wall 22 transversely with respect to the nozzle axis 20. The control cylinder, which in this case is on top, again is marked with the number 31. Its pertaining tension-compression-rod-type control member 33, in this case, by means of its free end, at the level of Point A5, at least indirectly by way of the corresponding pulling pin, is movably coupled with the downstream end of the central or center flap 10 as well as also with the end located there of the lever-type control member 28'. As illustrated in FIG. 8, on the bottom and on the outside, that is, therefore, on the respective lower wall 23, the same control kinematics with the drive may be provided. This also applies in connection with the other propelling nozzle half of FIG. 8 represented as an interior view. For each nozzle half, at least two control cylinders 31 and 32 (FIG. 8) are provided. According to FIG. 8, with respect to the lower wall 23, outside, the pertaining control cylinder has the reference number 32, a lever-type control member which is relevant with respect to 29 (top), has the reference number 29"; and the roller, which is closest to it, together with the section of the track, have the reference number 37' and 30".

According to FIG. 7, the pipe-type inlet 18, 19 have guide walls 43, 44 constructed as flow dividers which, at the same time, form local pipe reinforcements. According to the right-hand propelling nozzle half (interior top view), for example, the flaps 8, 9 and 10 in the plane 13 in which they are pivoted, are therefore consecutively directly pivotally connected, in a wall-surface-flush manner with low aerodynamical losses, behind the one outer lateral wall S0, the guide wall 43 and the meeting point S3 (from S1 and S2). Naturally, this applies analogously also with respect to the remaining flaps 11, 12. Reinforcing struts, such as 44', 45, which extend in the longitudinal direction of the housing, may in each case be provided on the outside on the upper and lower wall 22 and 23 of housing section 21 or of the pipe-type inlets, such as 19, in which case, the one strut 44' is at the same time a holding device for the control cylinder 31 which is, for example, movably anchored on it in Point B.

In particular, FIG. 8 also shows that the combined drive adjusting and guiding systems are enclosed by outer housings 46, 47 so that they are tight with respect to the environment. Such or similar housings or housing enclosures may analogously also be provided in the case of the already described propelling nozzle variant according to FIG. 5.

Figure 9:
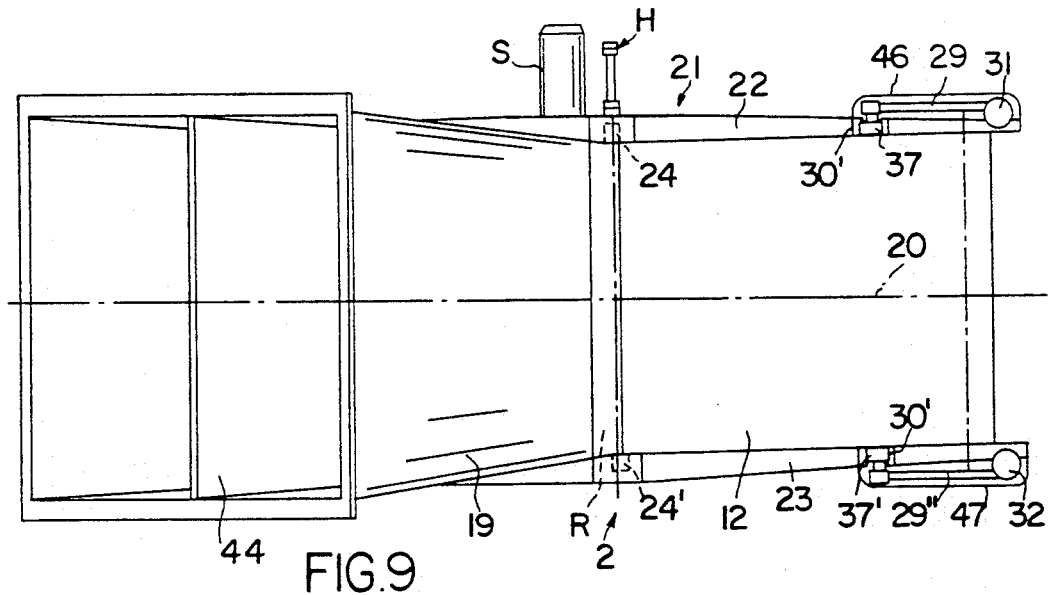
FIG. 9 is an enlarged view of the propelling nozzle or double-nozzle configuration of a propelling system with two engines according to FIG. 1 which are arranged in parallel and at a distance from one another, constructed for the throughput of two engine gas mass flows, with the assignment of the corresponding pipe feeders, in this case, in a first position of the nozzle flaps required for level flights or straight-ahead flights.
Figure 14:
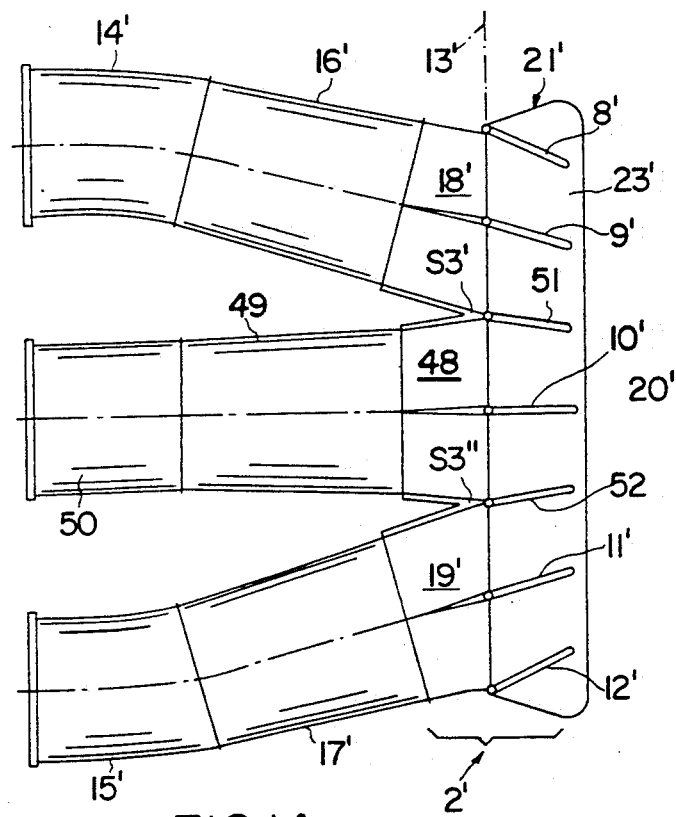

As another advantageous result of the above-described arrangement of the propelling system of the aircraft according to FIGS. 1 and 3, FIG. 9 shows the possibility of utilizing a specific space 48, for example, for droppable loads, between the two jet engines 3, 4 and locally in front of the propelling nozzle 2. In addition, FIG. 9 illustrates the basic or initial representation of the propelling nozzle for the straight-ahead flight. As far as required, details which were already described and illustrated in FIGS. 1, 3, 4 as well as 7 and 8, in FIG. 9 and also in FIGS. 10, 11 and 12 have again received the same reference numbers. In FIG. 9, line L represents the central or resulting jet deflection angle, in this case, zero, from the sum and the respective flow-off direction of the individual thrust jets carried through between the individual flaps 8, 9 and 9, 10 and 10, 11 and 11, 12, which, in the mentioned flap sequence, are indicated by the respective central streamlines L1, L2, L3 and L4 and which, in this propelling nozzle end position (straight-ahead flight) all meet in a Point SM on the Line L. The position of the medium or central flap 10 is therefore representative of the central or resulting jet deflecting angle. In this case, Line L (FIG. 9) is situated on the or as an extension of the longitudinal symmetry plane 5 or the longitudinal axis of the aircraft.

According to FIG. 9, an individual jet course therefore exists according to Lines L1 to L4 which—viewed from the Point SM—is expanded in the manner of a fan in the direction of the nozzle end. The relevant cross-sectional surfaces assigned to the latter between the flaps 8, 9 and 9, 10 and 10, 11 and 11, 12 are consecutively marked Q1, Q2, Q3 and Q4. According to FIG. 9 and corresponding to the invention—viewed from the central flap 10 or from the inside toward the outside—the nozzle flaps 8, 9 and 11, 12 in the corresponding plane 13, are arranged in each case with an increasing angular setting relative to a parallel line to the nozzle axis and to a respective pertaining parallel line relative to the symmetry axis 5, which in an analogous assignment is indicated by the angles of slope $\gamma1$–$\gamma4$ of the lines L1 and L4 with respect to line L as well as by the angles of slope $\phi2$ –$\phi3$ of lines L2 and L3 with respect to Line L.

According to FIG. 9, corresponding to the invention, the individual cross-sectional surface Q1, Q2, Q3 and Q4 are selected such—that is, Q3=Q2 and Q1=Q4—that their geometric cross-section results in the effectively required total jet cross-section of the propelling nozzle 2 corresponding to the required jet constriction.

In other words, the mentioned respective geometrical cross-section must be set to be larger by the jet constriction factor. The effect of deflecting losses is also added to the influence of the jet constriction.

Figure 10:
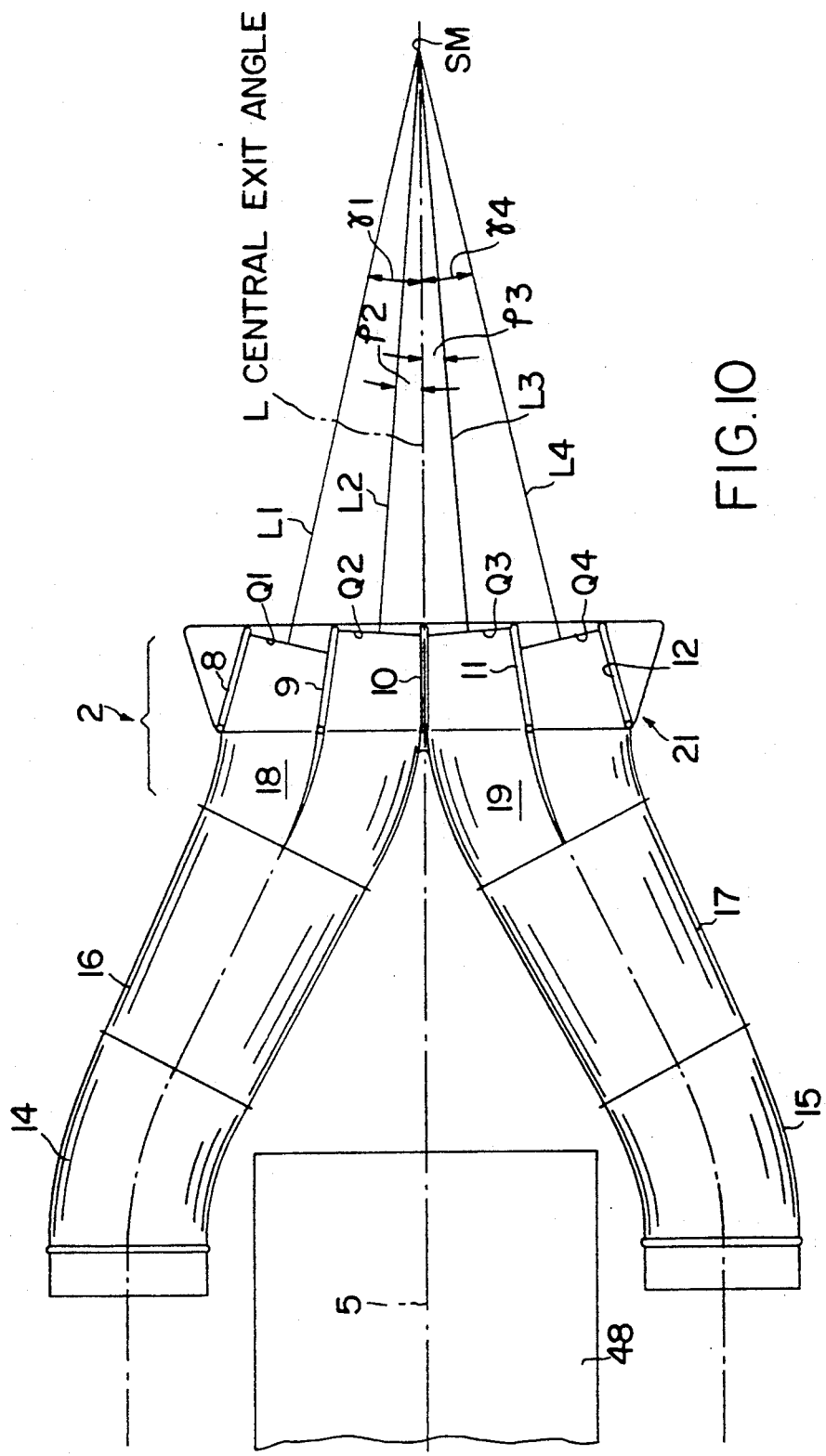
FIG. 10 is a view of the propelling nozzle or double-nozzle configuration according to FIG. 9, but in this case, in a second position of all nozzle flaps while forming a resulting or central jet deflecting angle of 10° with respect to the longitudinal symmetrical plane of the aircraft, illustrating the individual jet courses from two respective adjacent flaps indicated by respective center streamlines and aiming in different directions, the flaps being continuously set at different angles with respect to the plane in which they are pivotally disposed.
Figure 11:
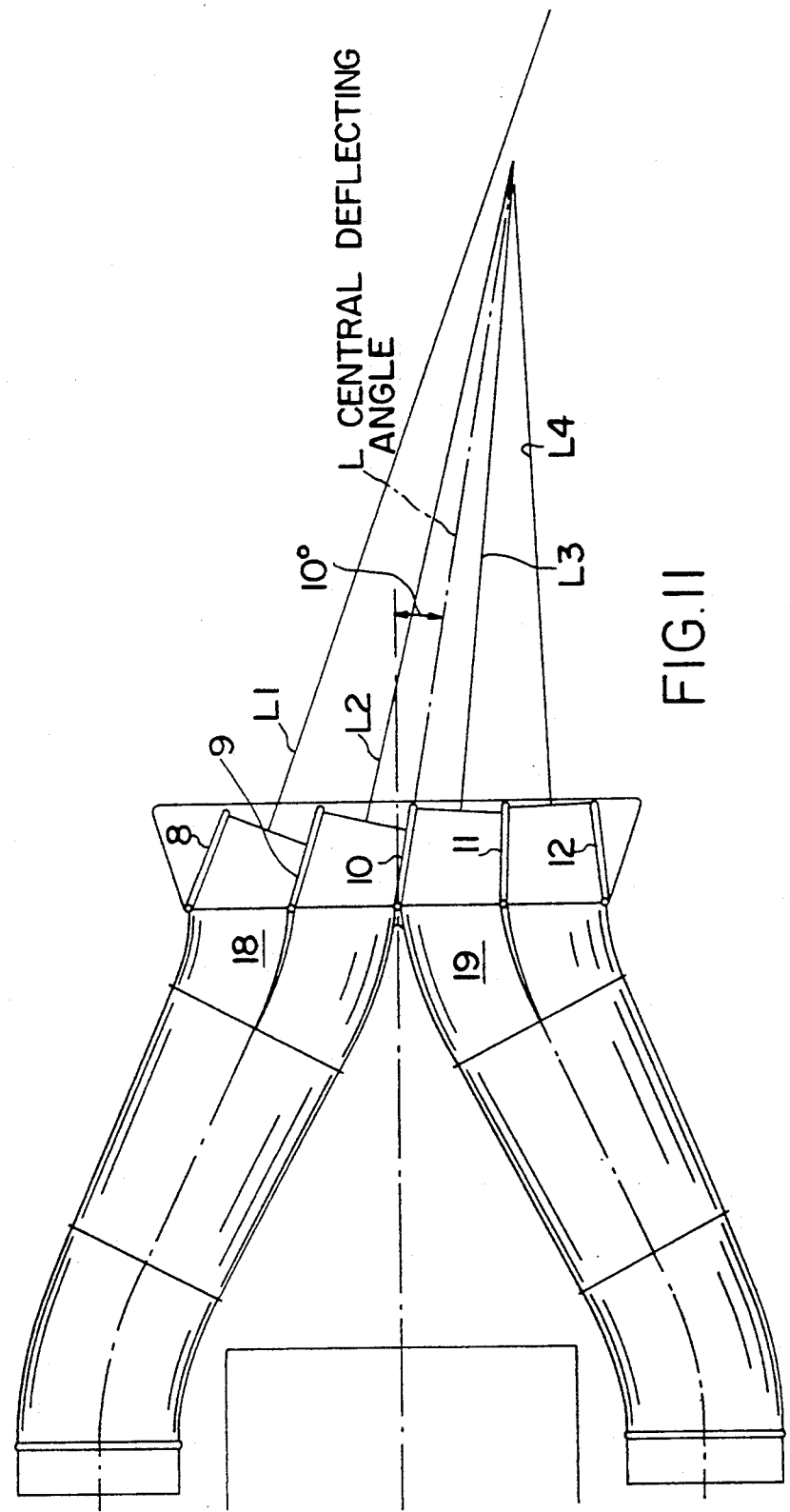
FIG. 11 is a view of the propelling nozzle or double-nozzle configuration according to FIG. 10, but deviating from it in this case by an additional central or resulting thrust jet deflection to 20° with bisecting line courses designed corresponding to the angles of incidence of the flaps.
Figure 12:
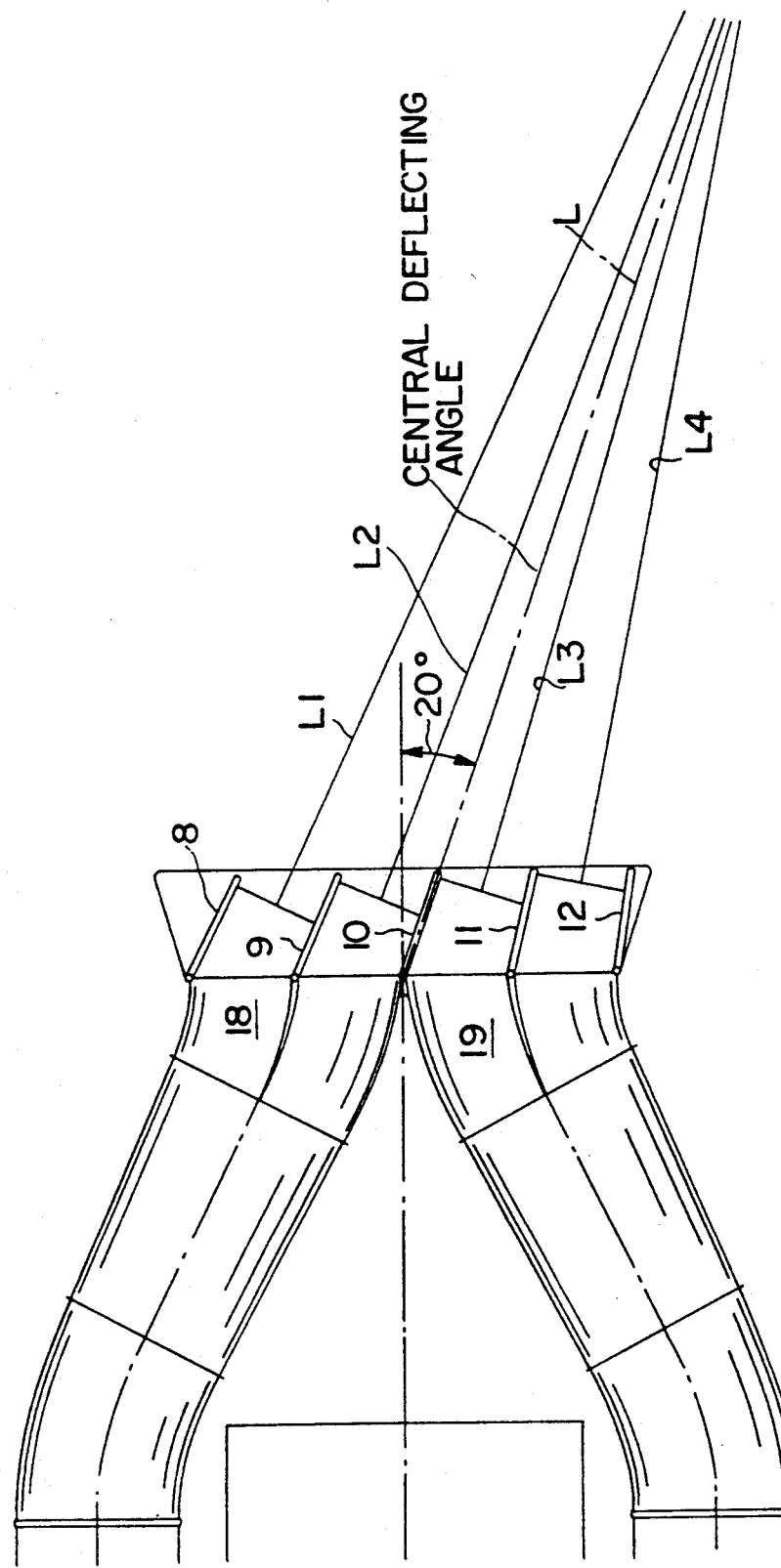
FIG. 12 is a view of the propelling nozzle or double-nozzle configuration according to FIG. 9, 10 and 11, in this case, deviating from FIG. by illustrating the reached maximal or nominal thrust jet deflection angle of 25°.

FIGS. 10, 11 and 12 successively represent a central or resulting jet deflecting angle of 10° (FIG. 10), 20° (FIG. 11), and 25° (FIG. 12). As shown particularly in FIG. 12, the gas mass flow coming from a jet engine 3—viewed with respect to the right half of the propelling nozzle in the flight direction—coming from the transition duct or the transition duct part 16—in the rectangular pipe-type inlet 18 and by way of the flaps 8, 9, 10, which follow, is hardly deflected or is deflected only to a relatively small extent. The deflecting and therefore pressure losses which therefore occur hardly occur in this nozzle area or occur only to an extremely low extent, require slightly smaller, appropriately adapted cross-sectional surfaces Q1, Q2 in the flow ducts between the flaps 8, 9 and 9, 10. On the left nozzle half (in an assignment to the inlet 19) the deflecting losses increase, necessitating locally larger cross-sectional surfaces Q3, A4 between the flaps 10, 11 and 11, 12 which can be adjusted according to the invention.

In the mentioned context, FIGS. 10, 11 and 12 therefore illustrate clearly that, in each case, with respect to the central jet deflecting angle (Line L with flap 10), the jets according to Lines L1, L2 emerge from the right nozzle part at an exaggerated angle and from the left nozzle part according to Line L3, L4 at a down-played angle. By means of the appropriately adapted development and arrangement of the tracks 30', 30" according to the invention and the corresponding development and arrangement of the control lever kinematics (FIG. 7 and 8), this can all be implemented in an advantageous manner.

The invention therefore permits that the narrowest nozzle cross-sections developed between the flaps 8 to 12, in the manner of a convergent nozzle course, are always situated on the propelling nozzle outlet, while forming the Lines L1, L2, L3, L4 according to the respective jet deflecting directions.

Therefore, in the case of the propelling nozzle according to the invention, in all operating positions, as a result of a reduction of the flow-through surface from the nozzle inlet in the direction of the nozzle outlet, there is always an acceleration of the flow. Therefore, no disadvantageous repercussions take place of the nozzle flow upon the engine or the corresponding engines 3, 4, despite an extremely fast response behavior of the propelling nozzle.

The construction of the propelling nozzle according to FIGS. 1, 3, 4, 7, 8 as well as FIGS. 9 to 12 or, in the sense of a comparable or similar "double-nozzle configuration" ensures, also in the case of a failure of one engine, such as 3, the full operatability; that is, the still exhausting gas mass flow of an engine, such as 4, can be accelerated by way of a nozzle half together with the inlet 19 in the manner of an individual nozzle, in which case then the central or resulting exit angle would be made available by the "new" central flap which is now responsible for it and the position of which would continue to be controlled by way of the previously central or medium flap 10 by the driving and control system.

The basic idea of the invention could also be implemented if the flaps, in the case of a cascade-type multi-flap arrangement were arranged at non-uniform mutual distances in the corresponding plane 13.

According to the invention—and not shown in detail—, the lever-type control members shown, for example in FIG. 7, with respect to the above-mentioned "exaggerated or down-played angles" can be constructed to be adjustable with respect to their overall length in order to be able to be on the safe side according to the operational requirements. A controllable or adjustable lever length may also make sense with respect to the nozzle trimming in an adaptation to variable engines with a variable performance propulsion level. In view, for example, of the latter facts, the use of variable flap length may also be advantageous, or the use of flaps which are slightly or differently curved in the longitudinal direction, according to the always existing nozzle convergence.

For example, by way of the accordion-type control lever linkage according to FIG. 7 (both sides outside rear), all nozzle flaps according to the invention are pivotally disposed on both ends, whereby a favorable distribution and introduction of force is obtained for the propulsion system. The lever-type control members therefore provide an additional "internal" equilibrium of forces in favor of reduced propulsion forces. Control devices, which are to be manufactured to be relatively light, in this case, particularly lever-type control members, represent other advantageous measures in favor of reduced propulsion forces, and thus, in turn, in favor of the fastest possible and as accurate as possible flap adjustments. As a result of their bearing, the flaps are loaded in the manner of plates so that, according to the invention, they can be constructed to be relatively slender as well as relatively light, for example, as hollow boxes with a honeycomb filling.

In addition to the above-illustrated and explained propelling nozzle concepts as "single or basic concepts" according to FIGS. 5 and 6 with two respective flaps, a propelling nozzle configuration would be conceivable according to the invention which is not further explained in the drawings and which consists of two outer flaps and a central or medium flap.

Figure 13:
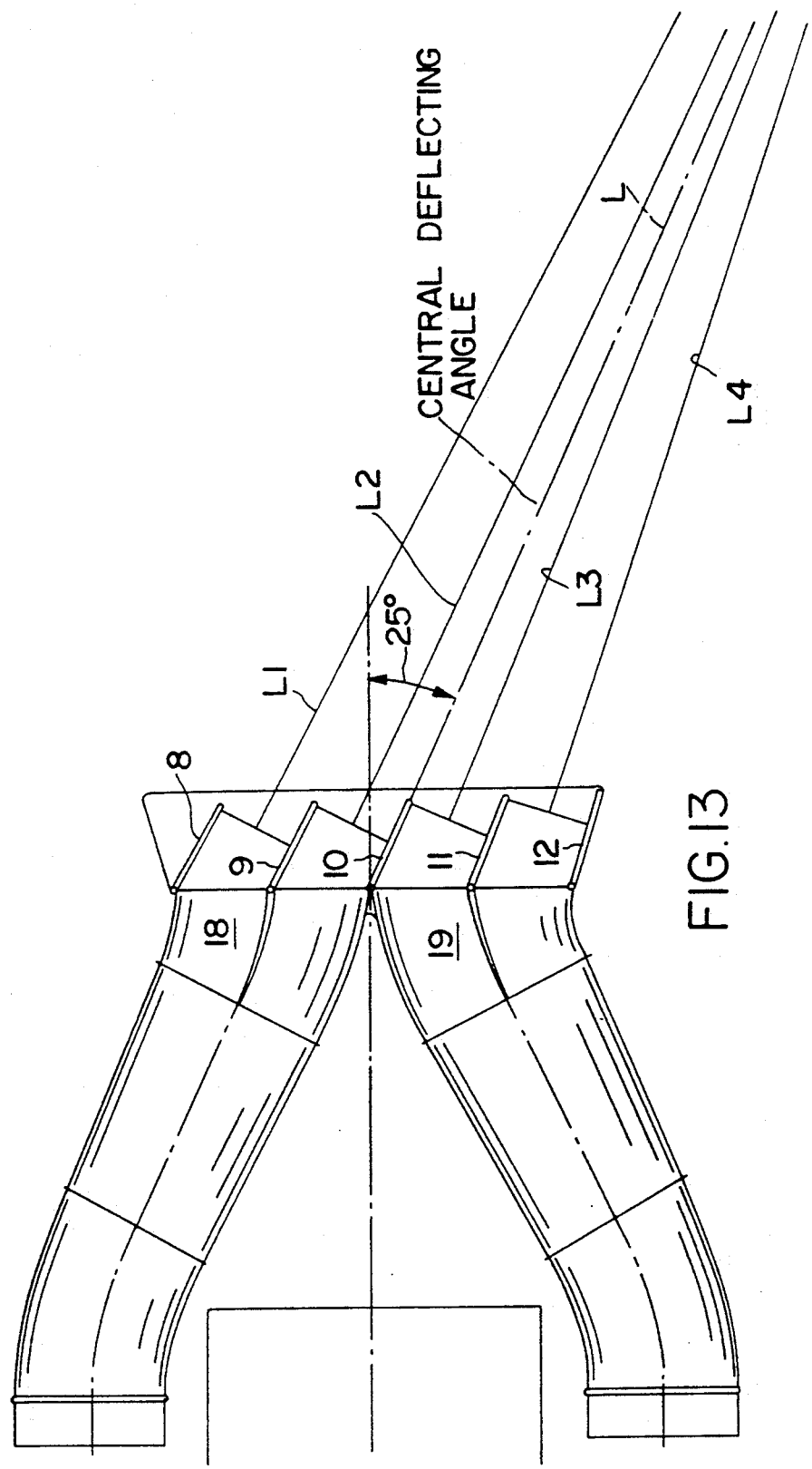
FIG. 13 is a top view as well as a view in which the top side is not covered of a propelling-nozzle configuration constructed with a view to three jet engines arranged in parallel at a distance from one another, including the pertaining exhaust pipe lines to the nozzle and in which the corresponding nozzle valve positions illustrate a level flight position or a straight-ahead flight position of the propelling nozzle.

The invention also permits the providing of a propelling nozzle which is suitable for the processing and controlling of the gas mass flows of several jet engines. For this purpose, FIG. 13 illustrates, for example, a propelling nozzle 2' in an assignment to three jet engines arranged at uniform distance in parallel next to one another in an analogous construction according to Numbers 3 and 4 (FIG. 3). In this case a part of the nozzle housing is composed of three pipe-type inlets which communicate with the respective gas mass flows, specifically two outer 18', 19' inlets and one central inlet 48 which is integrated in it symmetrically to the nozzle. The inlets 18', 19', 48 have a rectangular cross-section, with transition pipe parts 16', 17' (outside) and 49 (inside) connected in front of the inlets or to the inlets, which—in the direction of the flow —change from an initially circular to a rectangular cross-section. Pipe bends 14', 15' which, on the exhaust-gas-flowside, communicate with the two outer engines, on the outlet side, are connected to the transition pipe parts 16', 17' which taper out on account of the outer inlets 18', 19'. The central transition pipe part 49 communicates with a circular-cylindrical straight-axis pipe section 50 which, on the gas-exit-side, is connected to the central jet engine. In other words, in this case, the nozzle axis 20' or its extension in a symmetrically straight-axis extension by way of the pipe parts 49, 50, coincides with the axis of the central engine. Side-wall-side meeting points of the part of the nozzle housing containing the inlets 18', 19', 48 have the reference symbols S3', S3". The housing section 21', which connects to the part of the nozzle housing containing the inlets 18', 19', 48, contains the flaps 8', 9', 10', 11', 12' which are pivotally arranged in the plane 13' at uniform mutual distances, with the additional introduction of two other flaps 51, 52. The medium or central flap 10' again represents the respective central or resulting thrust jet deflecting angle, for example, zero, in the straight-ahead flight position indicated here. Also in FIG. 13, the flaps, on the side of the swivel bearing, are to be connected behind the respective, front-connected side walls, flow guiding walls and meeting points from inlets 18', 19', 48 in an aerodynamically advantageous manner or, with as few losses as possible, communicating flat with the surface. The drive and control kinematics (lever-type control members, tracks, control cylinders, or the like) may be provided, for example, in the manner shown and described according to FIGS. 7 and 8. As a result, identical, comparable or similar elements and components, such as the propelling nozzle according to FIG. 13 itself are marked 2' and the following numbers . . . .

In addition, the propelling nozzle concept according to the invention may be suitable and constructed for the three-dimensional thrust vector control, in that an additional deflecting wall or deflecting screen (FIG. 1 and 2) could be pivoted into the total mass flow from the nozzle which can be deflected in a plane by means of the flaps, or could be pivoted away upward with respect of the gas mass flow, in which case the last-mentioned measure would mean a jet deflection in the manner of the so-called "Coanda effect".

As shown in FIGS. 5 to 6, the flaps 8, 12 are constructed to be rounded on their rearward ends, specifically for an at least slight after expansion of the carried-through gas mass flow. However, for this purpose, both nozzle flaps 8, 12 may also receive an end-side inner widening in the sense of a slight nozzle divergence. In the case of several flaps (such as, FIG. 7), the individual flaps, for this purpose, at the downstream end, may be constructed to be tapering on both sides approximately in the form of a parabola or in a wedge shape.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A propelling nozzle arrangement for lateral thrust vector control in a jet engine powered aircraft, comprising:
   a nozzle housing with first and second housing walls extending essentially in parallel to a nozzle axis,
   a plurality of flap members disposed in the nozzle housing between the first and second housing walls and having their respective upstream ends pivotally connected to pivots extending transversely to the nozzle axis,
   control members for simultaneously pivoting the flap members about respective different pivot angles while maintaining an always convergent nozzle contour course between respective pairs of flap members with smaller exit side cross-sectional area than entrance side cross-sectional area, and a curved control guide track, wherein the control members have respective first parts connected to respective flap members and respective second parts guided in the guide track along with another respective second part of another control member to thereby control said pivoting movement of the flap members.

2. A propelling nozzle arrangement according to claim 1, wherein the control member first parts are connected to respective downstream ends of the flap members.

3. A propelling nozzle arrangement according to claim 1, wherein the nozzle housing exhibits a rectangular shape.

4. A propelling nozzle arrangement according to claim 3, wherein the control member first parts are connected to respective downstream ends of the flap members.

5. A propelling nozzle arrangement according to claim 4, wherein the flap members are pivotally disposed at the first and second housing walls at their upstream ends in a flap member entrance plane extending at a right angle with respect to the nozzle axis, the nozzle being essentially completely open from the flap member entrance plane to the nozzle exit plane.

6. A propelling nozzle arrangement according to claim 5, wherein the curved control guide track is disposed at one of the first and second housing walls, wherein the control members are constructed as lever members with respective second parts connected to a common guide roller for another control member second part, said common guide roller being guided in the control guide track.

7. A propelling nozzle arrangement according to claim 6, wherein a protective housing is provided for sealing the guide track and control members from the exhaust gases in the nozzle.

8. A propelling nozzle arrangement according to claim 7, wherein control guide tracks and control members are disposed in both of the first and second housing walls.

9. A propelling nozzle arrangement according to claim 1, further comprising flap member driving devices for forcibly moving the control members.

10. A propelling nozzle arrangement according to claim 9, wherein the flap member driving devices include fluidically operating piston-cylinder units with tension-compression rod members connected to the respective control members, said piston-cylinder units being disposed on the outside of the housing walls.

11. A propelling nozzle arrangement according to claim 6, further comprising flap member driving devices including fluidically operating piston-cylinder units with tension-compression rod members connected to the respective control members, said piston-cylinder units being disposed on the outside of the housing walls.

12. A propelling nozzle arrangement according to claim 11, further comprising guide slots at the first and second housing walls, said guide slots extending co-axially with the downstream end pivot connection of the control members and serving to guide pin-type extension of the control members, whereby a single one of said cylinder-piston units can simultaneously drive a plurality of the control members.

13. A propelling nozzle arrangement according to claim 1, wherein lateral housing walls connected to the first and second housing walls are sloped so as to define an expanding nozzle housing in the downstream direction, said lateral housing walls serving to accommodate maximal outer angle deflections of the flap members.

14. A propelling nozzle arrangement according to claim 12, wherein lateral housing walls connected to the first and second housing walls are sloped so as to define an expanding nozzle housing in the downstream direction, said lateral housing walls serving to accommodate maximal outer angle deflections of the flap members.

15. A propelling nozzle arrangement according to claim 8, wherein the respective guide tracks are curved in a uniformly arched-out manner in the direction of a common nozzle symmetric point which coincide with the position of a respective joint control lever linking pout and roller when in a starting position with the flap members disposed for straight-ahead flight.

16. A propelling nozzle arrangement according to claim 6, wherein the flap members which are pivotally arranged in the common flap member entrance plane at uniform or non-uniform distances, form an axial-flow-through cascade in which the flaps are controlled in such a manner by way of the tracks and the lever-type control members interacting with them that a central deflecting angle which is representative of the thrust vector control, is obtained with respect to the nozzle axis or the aircraft axis and/or the extended engine axis, by means of an individual jet course of the respective gas mass flows in each case carried through between two adjacent flaps, which, on the gas exit side, is divided in a fan-type manner and flows together in the downstream direction and in which the lever-type control members are hinged to one another in the manner of an accordion.

17. A propelling nozzle according to claim 16, wherein only a central flap arranged centrally with respect to the nozzle, is coupled directly with at least one driving device, in which case other flaps can be controlled by the lever-type control members which are hinged in the manner of an accordion and are positively controlled by way of the guide track.

18. A propelling nozzle according to claim 5, wherein the nozzle housing includes housing section in which the flaps are pivotally arranged and at least one pipe-type inlet connected approximately at the level of the flap member entrance plane, said housing construction being constructed in a rectangular/square manner at least on the connection side, and wherein starting from a rectangular essentially frame-type end section of the inlet, the first and second walls of the housing section which extend in parallel to the nozzle axis are arranged in a freely projecting manner.

19. A propelling nozzle arrangement according to claim 18, where the at least one pipe-type inlet has at least one flow divider which is preferably constructed in the manner in an aerodynamically surface-flush manner to the flow divider and to the straight ends of exterior walls of the pipe-type.

20. A propelling nozzle arrangement according to claim 1, wherein a plurality of jet engines are provided for the throughput and the thrust vector control of the gas mass flows, said jet engines being arranged at a spacing essentially in parallel next to one another, particularly in the wing and/or the fuselage of an aircraft, with a number of pipe-type or pipe bend-type inlets provided corresponding to the number of engines, a medium or central flap member being pivotally arranged in the longitudinal symmetry plane of the aircraft as well as symmetrically with respect to the longitudinal axis of the nozzle.

21. A propelling nozzle arrangement according to claim 19, wherein a plurality of jet engines are provided for the throughput and the thrust vector control of the gas mass flows, said jet engines being arranged at a spacing essentially in parallel next to one another, particularly in the wing and/or the fuselage of an aircraft, with a number of pipe-type or pipe bend-type inlets provided corresponding to the number of engines, a medium or central flap member being pivotally arranged in the longitudinal symmetry plane of the aircraft as well as symmetrically with respect to the longitudinal axis of the nozzle.

22. A propelling nozzle arrangement according to claim 5, wherein a plurality of jet engines are provided for the throughput and the thrust vector control of the gas mass flows, said jet engines being arranged at a spacing essentially in parallel next to one another, particularly in the wing and/or the fuselage of an aircraft, with a number of pipe-type or pipe bend-type inlets provided corresponding to the number of engines, a medium or central flap member being pivotally arranged in the longitudinally symmetry plane of the aircraft as well as symmetrically with respect to the longitudinal axis of the nozzle.

23. A propelling nozzle arrangement according to claim 22, wherein the flap members which in each case are situated the farthest on the outside, in the flap member entrance, are sealed off by means of rigid, elastic and/or movable seals, such as brush seals, with respect to adjacent pipe ends and/or guide wall ends as well as along the flap edges bordering on the first and second housing walls.

24. A propelling nozzle according to claim 6, wherein the lever-type control members are constructed to be adjustable with respect to their overall length.

25. A propelling nozzle arrangement according to claim 1, wherein in the case of a cascade arrangement of several flap members which are pivotally arranged in a transverse plane at mutual, preferably uniform distances, locally different narrowest cross-sections can be adjusted between them as a function of locally different jet deflection angles between two respective adjacent flaps.

26. A propelling nozzle arrangement according to claim 22, wherein in the case of a cascade arrangement of several flap members which are pivotally arranged in a transverse plane at mutual, preferably uniform distances, locally different narrowest cross-sections can be adjusted between them as a function of locally different jet deflection angles between two respective adjacent flaps.

* * * * *